(12) United States Patent
Hoft (10) Patent No.: US 8,605,150 B1
(45) Date of Patent: Dec. 10, 2013

(54) SINGLE IMAGE DC-REMOVAL METHOD FOR INCREASING THE PRECISION OF TWO-DIMENSIONAL FOURIER TRANSFORM PROFILOMETRY

(75) Inventor: Thomas A. Hoft, Arlington, MA (US)

(73) Assignee: Lockheed Martin Corporation, Bethesda, MD (US)

( * ) Notice: Subject to any disclaimer, the term of this patent is extended or adjusted under 35 U.S.C. 154(b) by 455 days.

(21) Appl. No.: 12/915,949

(22) Filed: Oct. 29, 2010

(51) Int. Cl.
*G01C 3/08* (2006.01)
*G01C 3/00* (2006.01)
*H04N 7/18* (2006.01)

(52) U.S. Cl.
USPC .......... 348/136; 348/142; 382/248; 356/4.09; 356/3

(58) Field of Classification Search
None
See application file for complete search history.

(56) References Cited

U.S. PATENT DOCUMENTS

| | | | | |
|---|---|---|---|---|
| 3,881,097 A * | 4/1975 | Lehmann et al. | ............ | 708/405 |
| 4,657,394 A * | 4/1987 | Halioua | ............ | 356/604 |
| 4,768,881 A * | 9/1988 | Juptner et al. | ............ | 356/457 |
| 6,618,510 B1 * | 9/2003 | Umiji | ............ | 382/260 |
| 7,479,921 B2 * | 1/2009 | Iritani et al. | ............ | 342/118 |
| 7,545,516 B2 * | 6/2009 | Jia et al. | ............ | 356/603 |
| 2008/0204762 A1 * | 8/2008 | Izatt et al. | ............ | 356/521 |
| 2009/0015842 A1 * | 1/2009 | Leitgeb et al. | ............ | 356/456 |
| 2010/0150467 A1 * | 6/2010 | Zhao et al. | ............ | 382/264 |
| 2010/0188400 A1 * | 7/2010 | Chen et al. | ............ | 345/420 |
| 2010/0189372 A1 * | 7/2010 | Chen et al. | ............ | 382/260 |
| 2010/0310130 A1 * | 12/2010 | Beghuin et al. | ............ | 382/106 |
| 2011/0115950 A1 * | 5/2011 | Wach | ............ | 348/241 |
| 2012/0116703 A1 * | 5/2012 | Pavillon et al. | ............ | 702/70 |

OTHER PUBLICATIONS

Bulut, Karahan. "Three Dimensional Optical Profilometry using a Four-Core Optical Fiber" (Jun. 2004) Thesis Statement. Sabanci University.*
Watson et al. "A Look at Motion in the Frequency Domain". (Apr. 1983) NASA Technical Memorandum 84352.*
Su et al. "Fourier transform Profilometry: A Review". (Feb. 2001) Optics and Lasers in Engineering. vol. 35, p. 263-284.*
Mitsu Takeda, Quan Gu, Masaya Kinoshita, Hideaki Takai, Yosuke Takahashi; Frequency-multiplex Fourier-transform profilometry; a single-shot three-dimensional shape measurement of objects with large height discontinuities and/or surface isolations; Applied Optics; 1997; p. 5347-5354; v. 36; Optical Society of America, USA.
Mitsu Takeda, Kazuhiro Mutoh; Fourier transform profilometry for the automatic measurement of 3-D object shapes; Applied Optics; 1983; p. 3977-3982; v. 22; Optical Society of America, USA.
Wenjing Chen, Xianyu Su; A new method for improving the measuring precision of 3D shape; Advanced Optical Manufacturing and Testing Technology; 2000; p. 412-415; v. 4231; Proceedings of SPIE, USA.

* cited by examiner

*Primary Examiner* — Sath V Perungavoor
*Assistant Examiner* — Matthew J Anderson
(74) *Attorney, Agent, or Firm* — Fraser Clemens Martin & Miller LLC; J. Douglas Miller (57) ABSTRACT

An image processing system includes an object illuminated by a pre-determined first spectrum of light and an array of fringe lines, an imaging device configured to capture an image of the object including the first spectrum of light and the fringe lines reflecting from a surface of the object, and a processor in signal communication with the imaging device to receive an input data representing the image of the object, wherein the processor: generates a first data model based on the input data; removes a DC-component from the first data model to create a second data model; and performs a two dimensional Fourier transform profilometry based on the second data model.

18 Claims, 6 Drawing Sheets

SINGLE IMAGE DC-REMOVAL METHOD FOR INCREASING THE PRECISION OF TWO-DIMENSIONAL FOURIER TRANSFORM PROFILOMETRY

STATEMENT REGARDING FEDERALLY SPONSORED RESEARCH OR DEVELOPMENT

Not applicable.

FIELD OF THE INVENTION

The present invention relates to signal processing and filtering. In particular, the present invention is directed to an image processing system and a method for processing an image to maximize a precision of Fourier transform profilometry.

BACKGROUND OF THE INVENTION

In Fourier transform profilometry (FTP) an object is illuminated by both ambient (controlled or uncontrolled) lighting and (highly controlled) sinusoidal fringes (fringes can be at multiple spatial frequencies but are in most implementations single-frequency). An image of the illuminated object is captured and then processed.

To obtain a three-dimensional map of the surface, a portion (e.g. either one-dimensional or two-dimensional) of a full spectrum is typically extracted from the captured image. The full spectrum of the captured image includes a modulated sinusoid corresponding to a height (i.e. depth) information of a surface of the object, wherein a contour of the object spreads (i.e. modulates) the spectrum of the sinusoidal fringes from a single bin to a region (i.e. blob) about the central frequency.

Also present in the spectrum of the captured image is a region referred to as a DC-component, which is a spectral information corresponding to the ambient-illuminated image of the object. The DC-component contains a DC bin, wherein DC stands for a direct current that typically represents an average intensity of the captured image. A region of the spectrum containing the DC-component typically overlaps with a region including the modulated sinusoid and therefore, limits the amount of information one can utilize.

The problems inherent to the overlapping regions of the spectrum of the captured image are currently addressed using multiple images and a one-dimensional spectrum processing.

For example, a method for FTP DC-removal has been proposed including a one-dimensional Fourier transform and an acquisition of an additional image of the object without fringes for use as a DC-spectrum to be removed from an image including the fringe (modulated sinusoid) spectrum. (See Chen and Su, Proc. SPIE V. 4231 p. 412, 2000).

An alternative approach requires the use of two cameras. Specifically, one camera captures an image of the object including reflected fringes, while another camera includes a filter to block a wavelength of the fringe illumination to capture only a DC-component and not the modulated-sinusoid. The "two-camera" solution requires significant increase in cost (additional camera, filter, and optics), system complexity (camera synchronization), and alignment (to ensure that the two cameras have precisely the same field-of-view). It may also be necessary to simultaneously illuminate the object with a non-fringed pulse of light of different wavelength than the fringes for motion-freezing and to provide identical illumination, and thus, identical DC-components for the two cameras (again increasing cost, complexity, and alignment).

It is desirable to develop a system and a method for maximizing a precision of Fourier transform profilometry using a single image and a two-dimensional spectrum processing.

SUMMARY OF THE INVENTION

Concordant and consistent with the present invention, a system and a method for maximizing a precision of Fourier transform profilometry using a single image and a two-dimensional spectrum processing, has surprisingly been discovered.

In one embodiment, an image processing system comprises: an object illuminated by a pre-determined first spectrum of light and an array of fringe lines; an imaging device configured to capture an image of the object including the first spectrum of light and the fringe lines reflecting from a surface of the object; and a processor in signal communication with the imaging device to receive an input data representing the image of the object, wherein the processor: generates a first data model based on the input data; removes a DC-component from the first data model to create a second data model; and performs a two dimensional Fourier transform profilometry based on the second data model.

The invention also provides methods for image processing.

One method comprises the steps of: providing an object; projecting a pre-determined spectrum of light toward the object; projecting an array of fringe lines toward the object; capturing a first image of the object including the light and the fringe lines reflecting from a surface of the object; generating a first data model based on the image captured; removing a DC-component from the first data model to create a second data model; and performing a two dimensional Fourier transform profilometry on the second data model.

Another method comprises the steps of: providing an object; illuminating the object with a pre-determined spectrum of light and an array of fringe lines; capturing a first image of the object including the light and the fringe lines reflecting from a surface of the object; generating a first spectrum based on the image captured, wherein a modulated sinusoid of the fringe lines is substantially contained in at least one of a first quadrant of the first spectrum and a complex conjugate of the first quadrant; retrieving a data representing a portion of a DC-component located in a second quadrant of the first spectrum, the second quadrant not containing any portion of the modulated sinusoid of the fringe lines; removing the DC-component from the first spectrum based upon the data representing the portion of the DC-component located in the second quadrant of the first spectrum to create a second spectrum; and performing a two dimensional Fourier transform profilometry on the second spectrum.

DRAWINGS

The above, as well as other advantages of the present invention, will become readily apparent to those skilled in the art from the following detailed description of the preferred embodiment when considered in the light of the accompanying drawings in which.

DETAILED DESCRIPTION OF THE INVENTION

The following detailed description and appended drawing describe and illustrate various embodiments of the invention. The description and drawing serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
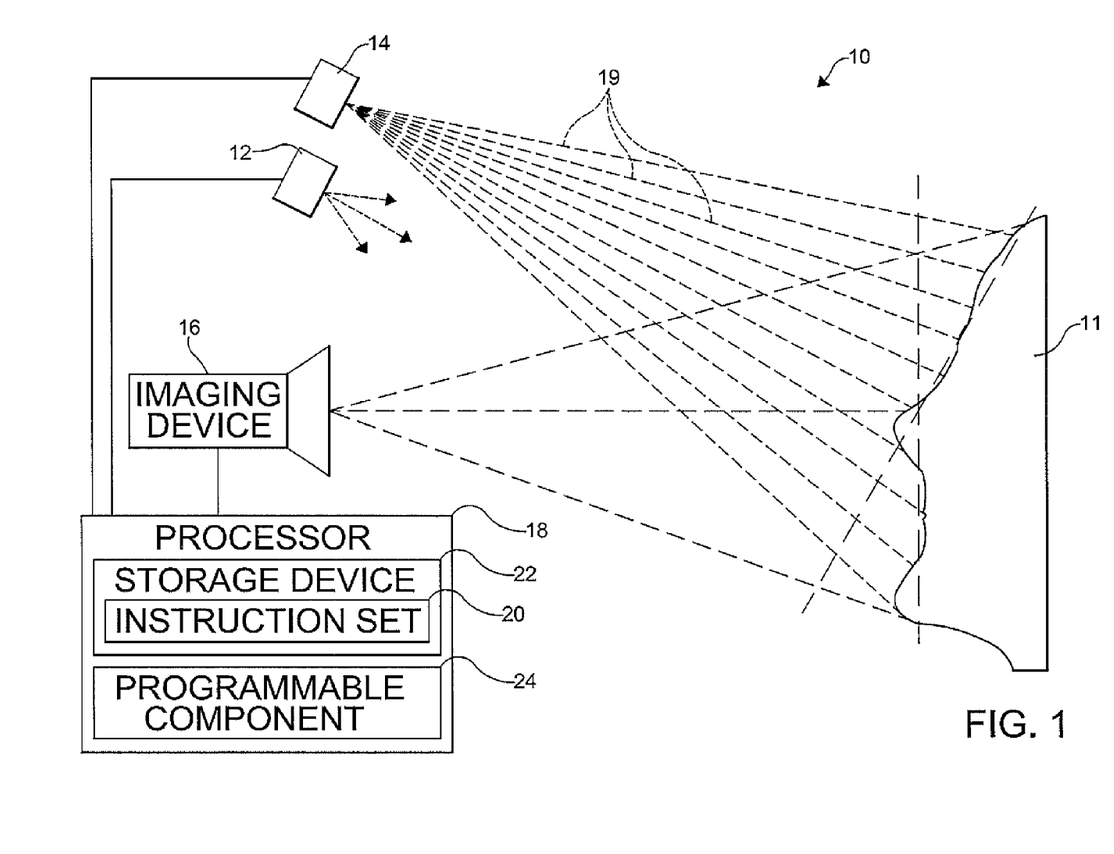
FIGS. 1 and 2 are schematic representations of a image processing system according to an embodiment of the present invention.
Figure 2:
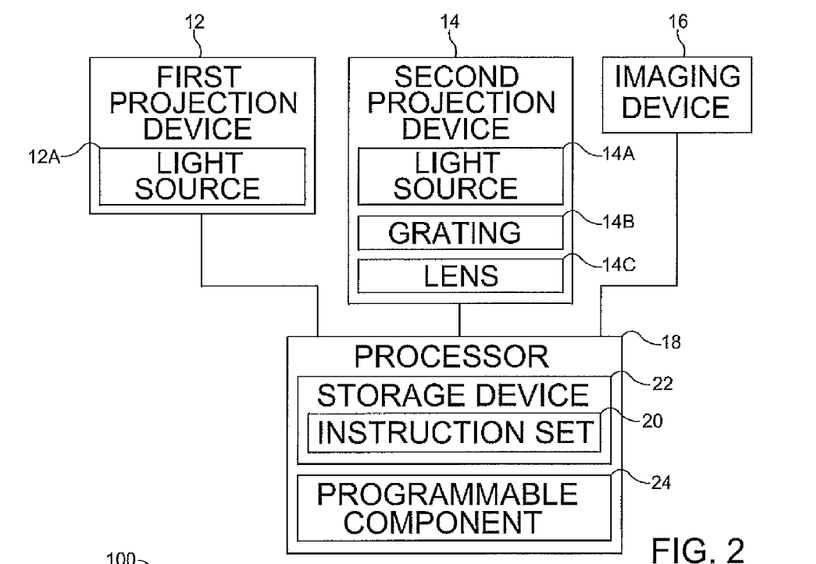

FIGS. 1-2 illustrate an image processing system 10 for capturing an image of an object 11 (e.g. a face of a subject) and processing the image of the object 11 according to an embodiment of the present invention. It is understood that the object 11 can be embodied by any surface, either stationary or moving, as appreciated by one skilled in the art of profilometry. As shown, the image processing system 10 includes a first projection device 12 (e.g. light source), a second projection device 14 (e.g. fringe source), an imaging device 16, and a processor 18 in signal communication with at least one of the first projection device 12, the second projection device 14, and the imaging device 16. The image processing system 10 can include any number of components, as desired. The image processing system 10 can be integrated into any user environment. In certain embodiments, the components are arranged to provide a maximum detectable slope, as known in the art.

The first projection device 12 typically includes a controlled light source 12A for providing an ambient light having a pre-defined spectrum to the object 11. As a non-limiting example, the first projection device 12 emits a spectrum of light used to define a DC-component during image processing. It is understood that any light source can be used. It is further understood that the first projection device 12 can be an uncontrolled source of ambient light such as the sun.

The second projection device 14 projects an optical grating pattern onto the object 11 undergoing measurement. As a non-limiting example, the second projection device 14 includes a light source 14A (e.g. white light, single frequency laser, etc.), an optical grating device 14B (e.g. diffraction grating), and a lens 14C arranged to generate an array of fringe lines 19. As a further non-limiting example, the projected grating pattern is a series of isophase surfaces (i.e. fringe lines 19). It is understood that an intersection of the fringe lines 19 with a surface of the object 11 generates a phase field represented by a modulated sinusoid of the fringe lines 19 reflected from the object 11. It is further understood that the modulated sinusoid (i.e. phase field) includes dimensional information (e.g. depth) of the object 11 when viewed from a perspective angle.

The imaging device 16 is typically a camera positioned to capture an image of the object 11 including the fringe lines 19 reflected from the object 11. However, the imaging device 16 can be any device or system configured to capture the modulated sinusoid (i.e. phase field) generated by the fringe lines 19 by receiving and recording a single image containing the fringe lines 19 that are reflected from the object 11 at a perspective angle.

The processor 18 may be any device or system (e.g. microcomputer) adapted to receive an input signal (e.g. data representing the image captured by the imaging device 16) and process the data based upon an instruction set 20. The instruction set 20, which may be embodied within any computer readable medium, includes processor executable instructions for configuring the processor 18 to perform a variety of tasks. The processor 18 may execute a variety of functions such as controlling the operation of the first projection device 12, the second projection device 14, and the imaging device 16, for example. As a non-limiting example, the processor 18 controls various aspects of the projection of fringe lines 19 onto the object 11, including such things as intensity of the emitted light and spacing of the fringe lines 19. It is understood that various algorithms and software can be used to analyze the image(s) captured by the imaging device 16.

As a non-limiting example, the instruction set 20 includes algorithms, software, formula and the like used for generating a data model (e.g. spectrum of the image, spatial frequency spectrum, and the like) representing the image captured by the imaging device 16. The instruction set 20 can also include algorithms, software, formula for linear filtering (e.g. Gaussian and averaging kernels), nonlinear filtering (median filter and repeated median filter), and maximum-entropy methods. As a further non-limiting example, the instruction set 20 includes means for normalizing a data representing at least a portion of the image captured by the imaging device 16. As a further non-limiting example, the instruction set 20 includes algorithms, software, formula and the like used for simple subtraction, simple division, Wiener filtering, mean-spectral-density filtering, and two-dimensional FTP processing.

In certain embodiments, the processor 18 includes a storage device 22. The storage device 22 may be a single storage device or may be multiple storage devices. Furthermore, the storage device 22 may be a solid state storage system, a magnetic storage system, an optical storage system or any other suitable storage system or device. It is understood that the storage device 22 may be adapted to store the instruction set 20. Other data and information may be stored and cataloged in the storage device 22 such as the data collected by the imaging device 16, for example.

The processor 18 may further include a programmable component 24. It is understood that the programmable component 24 may be in communication with any other component of the image processing system 10 such as the first projection device 12, the second projection device 14, and the imaging device 16, for example. In certain embodiments, the programmable component 24 is adapted to manage and control processing functions of the processor 18. Specifically, the programmable component 24 is adapted to modify the instruction set 20 and control the analysis of the signals and information received by the processor 14. It is understood that the programmable component 24 may be adapted to manage and control the first projection device 12, the second projection device 14, and the imaging device 16. It is further understood that the programmable component 24 may be adapted to store data and information on the storage device 22, and retrieve data and information from the storage device 22.

In use, the first projection device 12 provides an ambient illumination of the object 11, while the second projection device 14 provides the fringe lines 19 which are reflected from a surface of the object 11. The imaging device 16 receives the reflected light including the reflected fringe lines 19 and captures an image of the object 11 based upon the reflected light. It is understood that the imaging device 16 can be calibrated with at least one of the first projection device 12 and the second projection device 14 to establish a reference plane and a coordinate system for use during processing. In particular, the fringe lines 19 are projected onto the object 11 (e.g. based upon an arbitrary reference plane) which lies within a field of view of the imaging device 16. The fringe lines 19 reflected from the object 11 are received by the imaging device 16 and are recorded at an image plane as an array of pixels. In certain embodiments, the processor 18 generates a data model (e.g. spectrum) based on the data corresponding to the captured image of the object 11. The imaging device 16 transmits an input signal to the processor 18, wherein the input signal represents the data (e.g. image data relating to the array of pixels) corresponding to the captured image of the object 11. The processor 18 analyzes the input signal (e.g. image data) according to the instruction set 20 (e.g. to obtain a three-dimensional surface contour information). It is understood that the input signal can be analyzed and processed in accordance with a method according to the present invention.

FIGS. 3-7 illustrate a method 100 for processing an image according to an embodiment of the present invention. In step 102, the fringe lines 19 are oriented in a pre-determined configuration toward the object 11. As a non-limiting example, the fringe lines 19 projected on the object 11 are oriented in neither a vertical nor a horizontal configuration to ensure that a spectrum of the modulated sinusoid is contained entirely in at least one of a first quadrant of a power spectrum of an image of the object 11 and a complex conjugate of the first quadrant.

Figure 4:
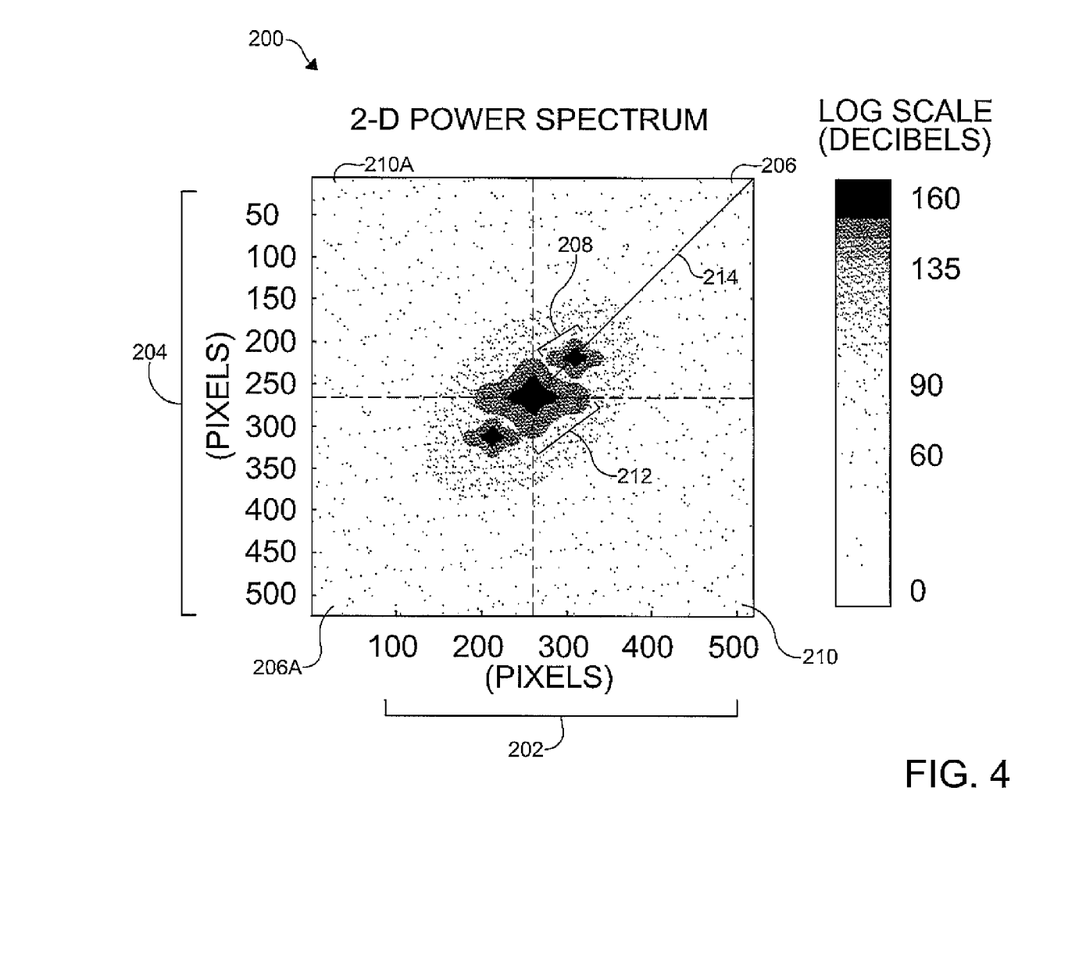
FIG. 4 is a graphical plot of a two-dimensional power spectrum used in the method of FIG. 3, showing four quadrants of the power spectrum and a reference line disposed across a modulated sinusoid.

As an illustrative example, FIG. 4 illustrates a graphical plot 200 of a power spectrum (i.e. in decibels) based on an image of the object 11 captured by the imaging device 16. As shown, an X-axis 202 and a Y-axis 204 represent a coordinate system of pixels, for reference. A signal quadrant 206 (e.g. upper right quadrant) of the power spectrum contains a modulated sinusoid 208 of the reflected fringe lines 19. A DC quadrant 210 (e.g. lower right quadrant) does not include a portion of the modulated sinusoid 208 of the fringe lines 19. It is understood that the full spectrum of the image (e.g. data model) has been shifted so that a zero-frequency bin is in a center of the power spectrum represented by the graphical plot 200. Accordingly, a DC component 212 of the full image spectrum is contained in each of the four quadrants 206, 210, 206A, 210A. Furthermore, since the acquired camera data is real (i.e. not complex), the full spectrum of the image is Hermitian-symmetric (i.e. the lower-left quadrant 206A is the complex conjugate of the upper-right quadrant (the signal quadrant 206) reflected about a central origin and the upper left quadrant 210A is the complex conjugate of the lower right quadrant (the DC quadrant 210) reflected about the central origin. It is further understood that two of the quadrants 206A, 210A respectively contain information which is redundant with the other two quadrants 206, 210. A reference line 214 overlays a portion (e.g. the signal quadrant 206) of the graphical plot 200 for subsequent comparison to other plots.

Figure 3:
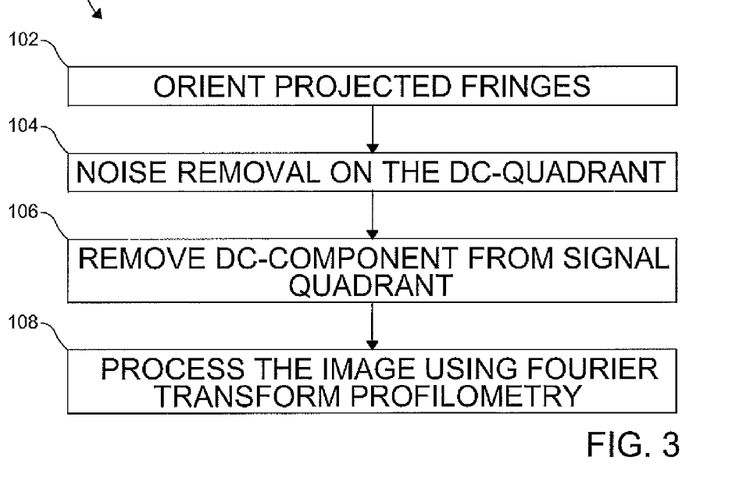
FIG. 3 is a schematic flow diagram of a method for processing an image according to an embodiment of the present invention.

In step 104, a noise removal process is applied to the DC-quadrant 210 to remove noise (e.g. generated by the imaging device 16, associated amplification, read-out electronics, and the like). It is understood that any type of noise removal can be used such as linear filtering (e.g. Gaussian and averaging kernels), nonlinear filtering (median filter and repeated median filter), and maximum-entropy methods. In certain embodiments, the DC-quadrant 210 is normalized so that a peak value of the DC-quadrant 210 (at zero-frequency or the first frequency bin) matches a peak value of the signal-quadrant 206 (at the same frequency bin).

Figure 5:
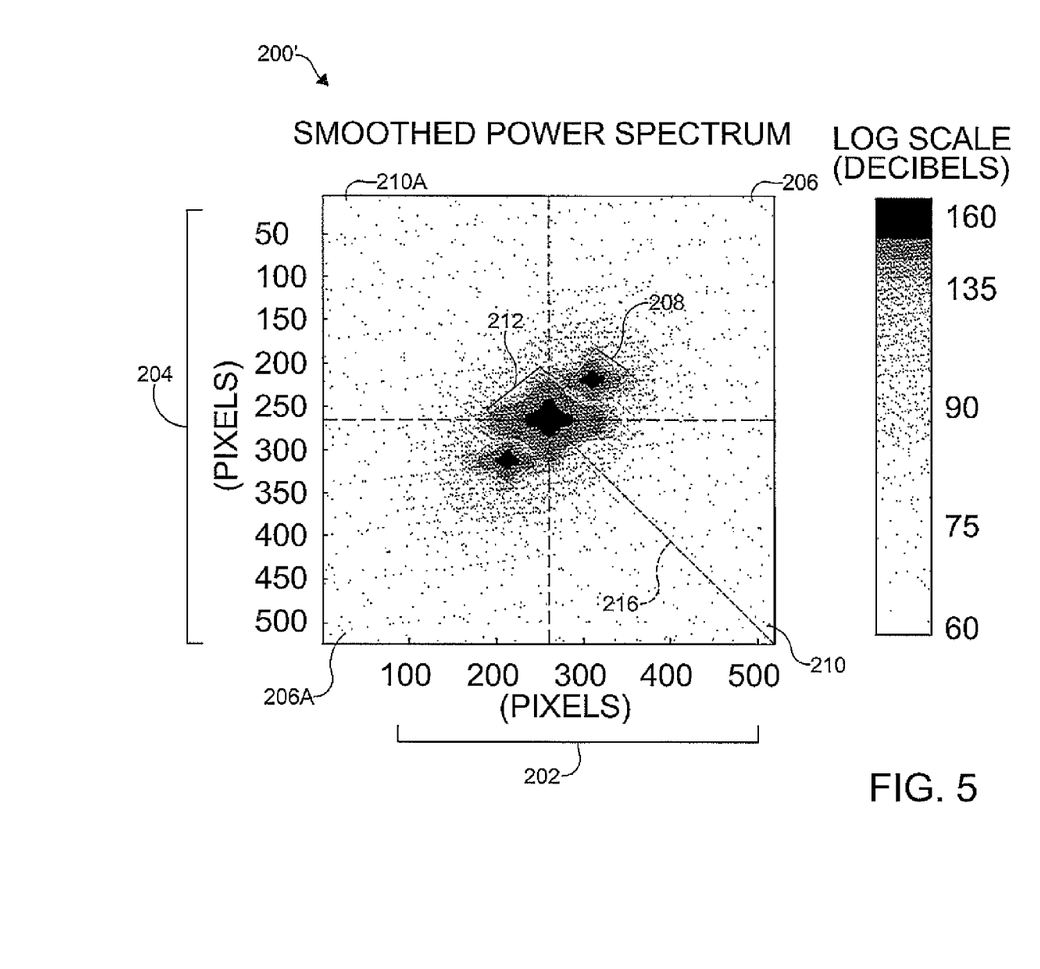
FIG. 5 is a graphical plot of the two-dimensional power spectrum of FIG. 4 with a noise removed.

As an illustrative example, FIG. 5 illustrates a graphical plot 200' of a power spectrum (i.e. decibels) similar to the graphical plot 200 except as described below. As shown, the graphical plot 200' illustrates the modulated sinusoid 208 of the fringe lines 19 and the DC component 212 after the noise removal process is applied. Additionally, a reference line 216 overlays a portion (e.g. the DC quadrant 208) of the graphical plot 200' for subsequent comparison to other plots.

In step 106, the DC-component 212' is removed from the image. As a non-limiting example, data representing the DC-component 212 is removed from the signal-quadrant 206 using simple subtraction. However, any data removal means (e.g. linear or non-linear) can be used such as simple division, Wiener filtering, and mean-spectral-density filtering, for example.

Figure 6:
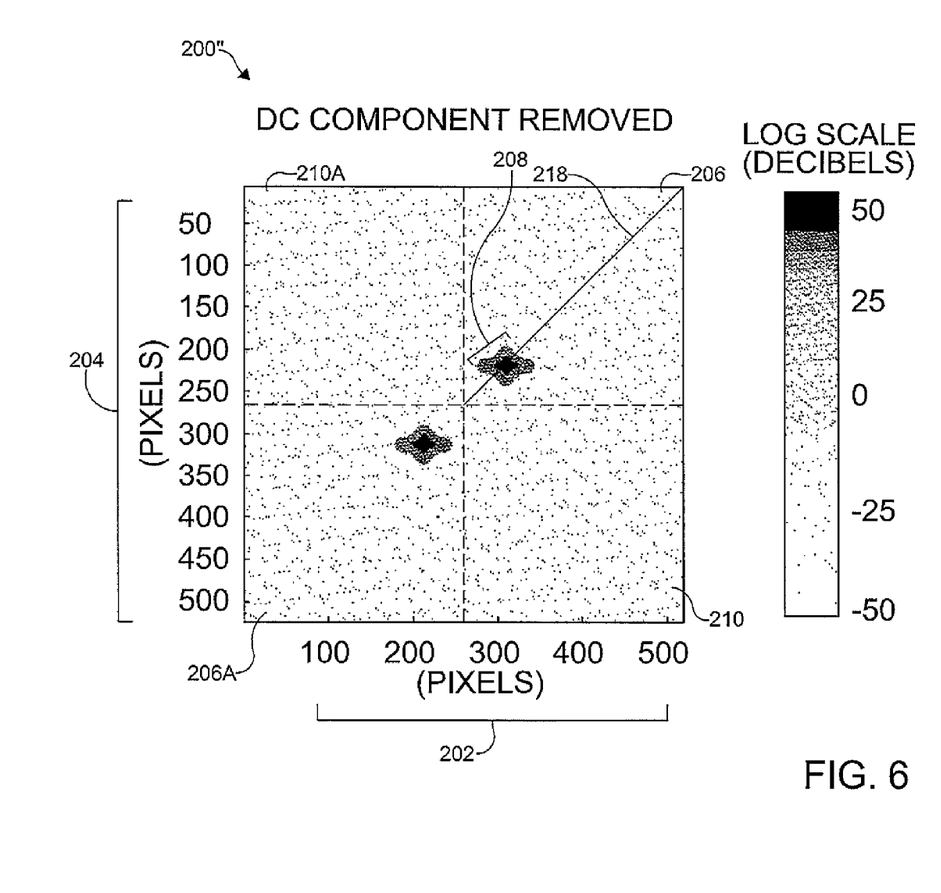
FIG. 6 is a graphical plot of the two-dimensional power spectrum of FIG. 4 with a DC-component removed and showing a reference line disposed across the modulated sinusoid.

As an illustrative example, FIG. 6 illustrates a graphical plot 200" of a power spectrum (i.e. decibels) similar to the graphical plot 200 except as described below. As shown, the graphical plot 200" illustrates the modulated sinusoid 208 of the fringe lines 19 after the DC component 212 (and noise) has been removed. Additionally, a reference line 218 overlays a portion (e.g. the signal quadrant 206) of the graphical plot 200" for subsequent comparison to other plots.

Figure 7:
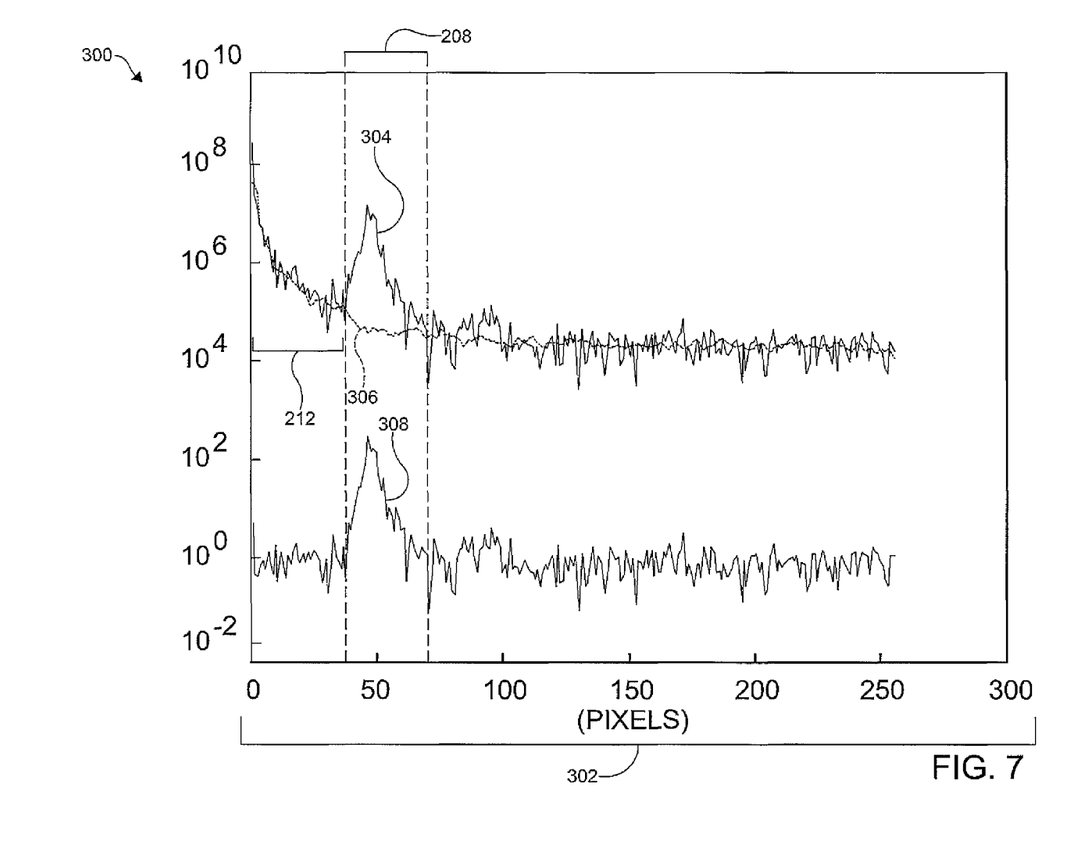
FIG. 7 is a graphical plot of a power spectrum along the lines shown in FIGS. 4 and 6.

As a further illustrative example, FIG. 7 illustrates a graphical plot 300 of a power spectrum (i.e. in log scale for comparison) of the image analyzed in FIGS. 4-6. As shown, an X-axis 302 represents a coordinate system of pixels, wherein pixel zero is located at a central origin of the graphical plots 200, 200', 200", for reference. A fringe line 304 represents a log scale of the power spectrum of the image taken along reference line 214. A noise line 306 represents a log scale of the power spectrum taken along reference line 216. A corrected fringe line 308 represents a log scale of the power spectrum taken along reference line 218. Accordingly, the corrected fringe line 308 is representative of the modulated sinusoid 210 in the signal quadrant 206 after the DC-component 212 has been removed. As shown, the fringe line 304 and the noise line 306 have been shifted by an arbitrary constant in order to more easily compare the corrected fringe line 308 with the fringe line 304. It is understood that the corrected fringe line 308 captures the modulated sinusoid 208 without the noisy influence of the DC-component 212.

In step 108, the remainder of a two-dimensional FTP processing stream is applied to the image (e.g. extract the modulated sinusoid 208 and "zero out" the remaining data, compute a two-dimensional inverse Fourier transform, extract a phase, and scale the data to three-dimensional co-ordinates based on system optics and geometry).

The present invention provides an improved imaging of non-stationary or non-cooperative objects. Since conventional methods require two images of an object, the object must be completely stationary over a particular time duration necessary to acquire two images at the same period in time. The present invention does not require a stationary object and thus, extends an application to a wider class of imaging scenarios.

The present invention uses a two-dimensional spectrum processing instead of a one-dimensional spectrum processing. The conventional one-dimensional methods suffer from line-by-line artifacts in the reconstructed image, while the two-dimensional method does not. Compared to a two-camera method, the present invention requires no additional hardware, therefore minimizing cost and complexity.

While certain representative embodiments and details have been shown for purposes of illustrating the invention, it will be apparent to those skilled in the art that various changes may be made without departing from the scope of the disclosure, which is further described in the following appended claims.

What is claimed is:

1. An image processing system comprising:
   an object illuminated by a pre-determined first spectrum of light and an array of fringe lines;
   an imaging device configured to capture a power spectrum image of the object including the first spectrum of light and a fringe image including the fringe lines reflecting from a surface of the object, the fringe image offset from the power spectrum image into a quadrant of the power spectrum image; and
   a processor in signal communication with the imaging device to receive an input data representing the power spectrum image and the fringe image of the object, wherein the processor:
     generates a first data model based on the input data;
     removes a DC-component from the first data model to create a second data model; and
     performs a two dimensional Fourier transform profilometry based on the second data model.

2. The system according to claim 1, further comprising at least one projection device to emit at least one of the first spectrum of light and the fringe lines.

3. The system according to claim 2, wherein the processor is in signal communication with the at least one projection device to control an intensity of the fringe lines.

4. The system according to claim 2, wherein the processor is in signal communication with the at least one projection device to control a spacing between the fringe lines.

5. The system according to claim 1, wherein the processor removes a noise from the first data model prior to removing the DC-component.

6. The system according to claim 1, wherein at least one of the first data model and the second data model includes a spectrum of the image.

7. A method for image processing, the method comprising the steps of:
   providing an object,
   projecting a pre-determined spectrum of light toward the object;
   projecting an array of fringe lines toward the object;
   orienting the fringe lines;
   capturing a first image of the object including a power spectrum image of the spectrum of light and a fringe image including the fringe lines reflecting from a surface of the object;
   generating a first data model based on the power spectrum image and the fringe image captured;
   removing a DC-component from the first data model to create a second data model, wherein at least one of the first data model and the second data model includes a spectrum of the first image, and wherein a modulated sinusoid of the fringe lines is substantially contained in at least one of a first quadrant of the spectrum of the first image and a complex conjugate of the first quadrant; and
   performing a two dimensional Fourier transform profilometry on the second data model.

8. The method according to claim 7, wherein the fringe lines are oriented in a configuration that is not vertical.

9. The method according to claim 7, wherein the fringe lines are oriented in a configuration that is not horizontal.

10. The method according to claim 7, further comprising the step of removing a noise from the first data model prior to the step of removing the DC-component.

11. The method according to claim 10, wherein the noise is removed using at least one of a linear filter, a non-linear filter, and a maximum-entropy method.

12. The method according to claim 7, further comprising the step of normalizing the first data model prior to the step of removing the DC-component.

13. The method according to claim 7, further comprising the step of isolating at least a portion of the DC-component from the sinusoid in the first data model.

14. A method for image processing, the method comprising the steps of:
   providing an object;
   illuminating the object with a pre-determined spectrum of light and an array of fringe lines;
   capturing a first image of the object including the light and the fringe lines reflecting from a surface of the object;
   generating a first spectrum based on the image captured, wherein a modulated sinusoid of the fringe lines is substantially contained in at least one of a first quadrant of the first spectrum and a complex conjugate of the first quadrant;
   retrieving a data representing a portion of a DC-component located in a second quadrant of the first spectrum, the second quadrant not containing any portion of the modulated sinusoid of the fringe lines;
   removing the DC-component from the first spectrum based upon the data representing the portion of the DC-component located in the second quadrant of the first spectrum to create a second spectrum; and
   performing a two dimensional Fourier transform profilometry on the second spectrum.

15. The method according to claim 14, wherein the fringe lines are oriented in a configuration that is not vertical.

16. The method according to claim 14, wherein the fringe lines are oriented in a configuration that is not horizontal.

17. The method according to claim 14, further comprising the step of removing a noise from the first spectrum prior to the step of removing the DC-component.

18. The method according to claim 14, further comprising the step of normalizing the first spectrum prior to the step of removing the DC-component.

* * * * *